Nov. 12, 1963 L. D. BARRY 3,110,764

MAGNETIC RECORDING AND REPRODUCING

Filed April 6, 1955 4 Sheets-Sheet 1

INVENTOR.

Leonard D. Barry

MAGNETIC RECORDING AND REPRODUCING

INVENTOR.

Leonard D. Barry

MAGNETIC RECORDING AND REPRODUCING

Filed April 6, 1955 4 Sheets-Sheet 3

INVENTOR.

Leonard D. Barry

Nov. 12, 1963 L. D. BARRY 3,110,764

MAGNETIC RECORDING AND REPRODUCING

Filed April 6, 1955 4 Sheets-Sheet 4

INVENTOR.

Leonard D. Barry 3,110,764
MAGNETIC RECORDING AND REPRODUCING
Leonard D. Barry, 19300 Pennington Drive, Detroit 21, Mich.
Filed Apr. 6, 1955, Ser. No. 499,657
24 Claims. (Cl. 178—6.6)

This invention relates to magnetic recording and reproducing and in particular to a novel type head and to recording and reproducing circuits and apparatus associated therewith.

This invention briefly comprehends a scanning-beam vacuum-tube magnetic recording and reproducing head.

It is an object to combine into one unit or tube magnetic transducers for recording and replay and a target scanning system for successively energizing the transducers to eliminate exterior wiring between individual targets and transducers.

Another object is to provide a novel recorder wherein the flux density in the transducers controls the establishment of the electrical signal reproduced. A further object is to provide a novel direct-current magnetic recorder and reproducer.

Another object is to provide a novel scanning-beam-tube recording head together with apparatus suited for recording-reproducing video, sound, or other electrical signals on a magnetic medium and for reproducing the electrical signals in particular for recording lines of video on a tape.

Another object is to provide a sensitive reproducing head wherein an electron beam is deflected by the magnetic recording as the beam and recorded medium are relatively moved, the electrical signal being reproduced in accordance with the displacement of the beam.

A further object is to amplify the electrical signal being reproduced (or recorded) by the increase of displacement of the beam with distance of projection relative to the beam spot size and by secondary emission from the surface which the beam strikes. Also it is desired to provide desirable shields, deflector cores, and receivers for the electron beam.

Another object is to provide a recording-reproducing head wherein the scanning by an electron signal beam on a series of conductors records a tape in transverse lines by means of a row of small recording-reproducing needle-like electromagnets lined in a row across the tape, the coils thereof being connected each in a circuit to a conductor which the beam strikes and energized in succession and in accord with the variation of the beam's intensity or position; and wherein a scanning electron beam in the same tube is deflected to a particular level between opposite terminals of a target according to the static flux in the needles when scanned, to reproduce the electrical signal.

Another object is to further reduce the tape speed for video recording and to provide a much improved video recorder.

A further object is to record picture signals in transverse lines which touch along their length forming solid pictures or video frames whereby they can be replayed without line synchronization of the medium.

Another object is that a television receiver supply the synchronizing pulses for both recording and playback of the video picture and further to record only vertical synchronizing pulses and utilize both the received and recorded vertical pulses to synchronize the tape drive for replay.

Another object is to provide an arrangement to retrace lines of recorded sound or signals by automatically synchronizing tape speed with scanning speed, by coordinating scanning with recorded lines, and by aligning the head with recorded lines automatically.

Another object is to provide a head that can both record and reproduce a line or an area on a magnetic medium while the medium and head are relatively stationary.

A further object is to provide arrangements to take still or moving pictures from a television type camera or receiver and reproduce them on a television receiver.

A further object is to provide a novel recorder for recording and reproducing still pictures or other information from magnetic slides or film strips or motion pictures from magnetic film.

Other and further objects and advantages will hereinafter be pointed out or should readily become evident to those skilled in the art by reading this specification disclosing some of the forms and embodiments of this invention described with reference to the accompanying drawings wherein.

Figure 6:
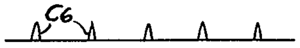
Figure 7:
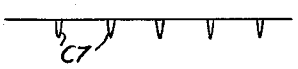
Figure 8:
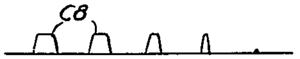

FIGURES 6, 7, and 8 are respectively diagrams of received sync pulses, recorded sync pulses, and the resulting sum alignment pulses.

Figure 9:
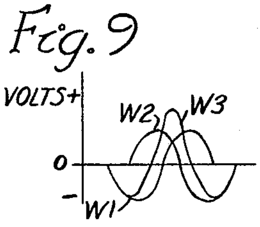
Figure 10:
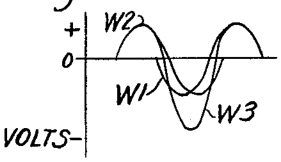

FIGURES 9 and 10 are diagrams of line alignment pulses in different phase relations.

Figures 11, 12:
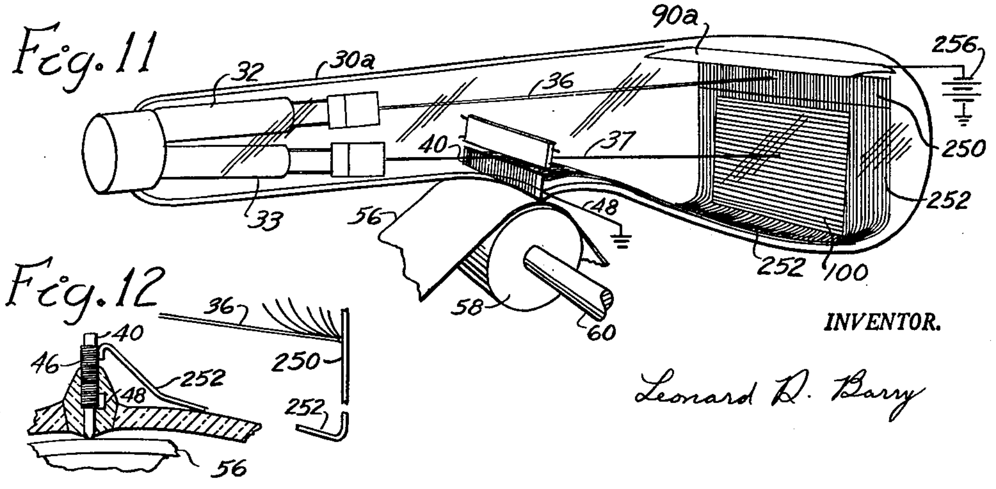

FIGURE 11 is a diagrammatic view of another magnetic recording and reproducing tube.

FIGURE 12 is a broken sectional enlargement of portions of the recording tube of FIGURE 11 showing portions of a recording conductor and transducer.

Figure 13:
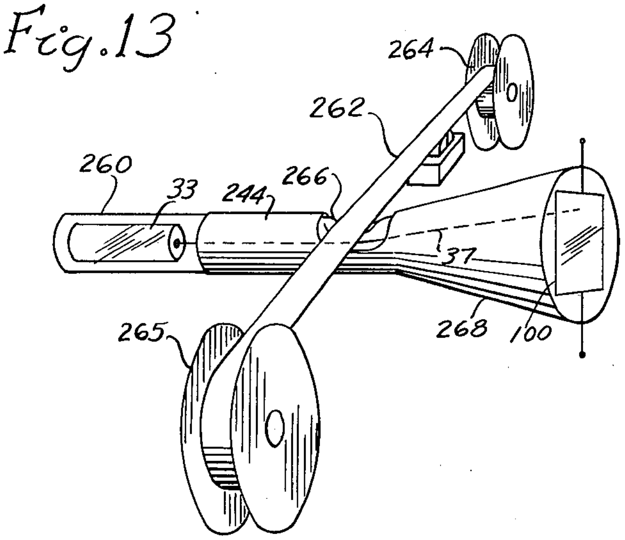

FIGURE 13 is a diagrammatic view of a beam-tube reproducing head for reproducing a recording along a continuous line on a medium such as along the length of the tape shown.

FIGURES 14, 15, 16, and 17 are sectional views crosswise the type of reproducing tube shown in FIGURE 13 illustrating variations of shielding.

Figure 18:
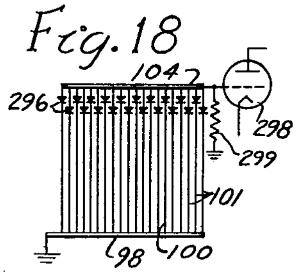
Figure 19:
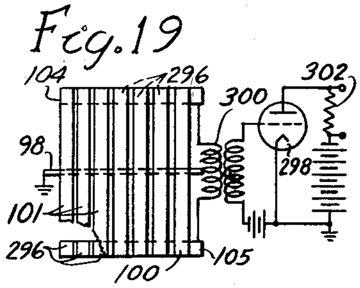
Figure 20:
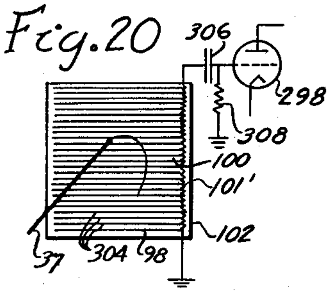

FIGURES 18, 19 and 20 are schematic views of variations of the reproducing area and circuits.

Figure 21:
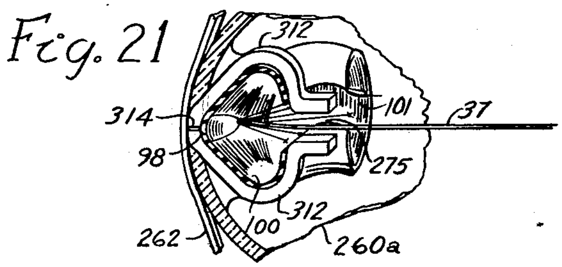

FIGURE 21 is a sectional view through the end face of a reproducing tube taken parallel with the beam illustrating another beam deflecting and reproducing arrangement.

Figure 22:
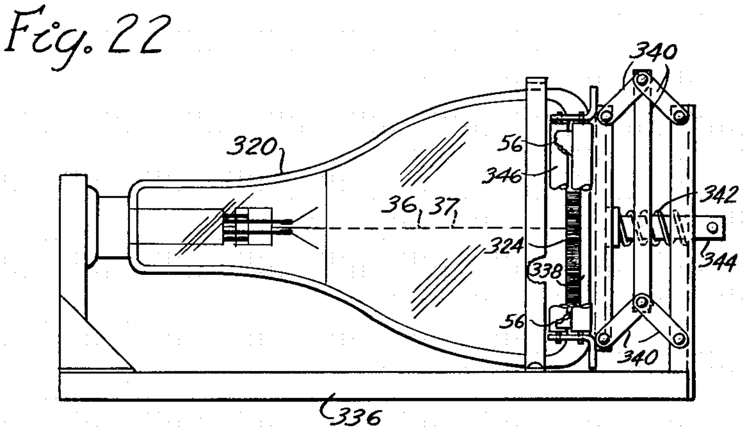

FIGURE 22 is a side view of a recording and reproducing head for magnetic slides or film strips.

Figure 23:
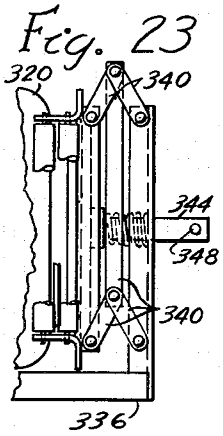

FIGURE 23 is a partial side view of the head shown in FIGURE 22 showing the film holder in retracted position.

Figure 24:
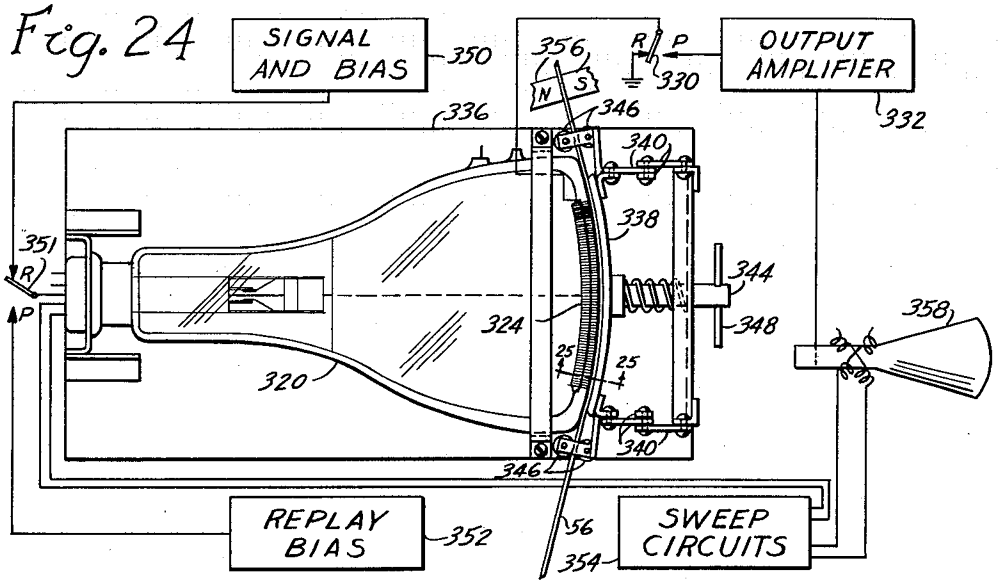

FIGURE 24 is a top view of the head shown in FIGURE 22 and a block diagram of associated circuits.

Figure 25:
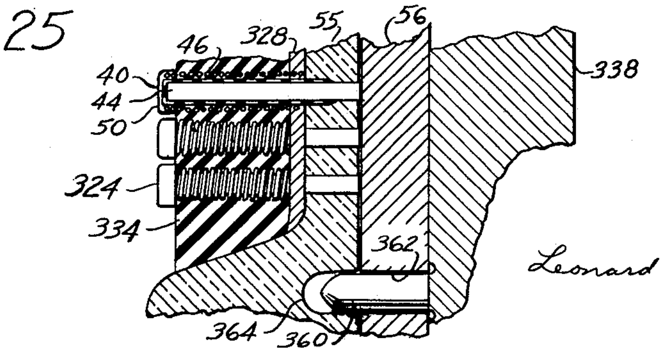

FIGURE 25 is an enlarged sectional view taken on line 25—25 of FIGURE 24 through the face of the head.

Figure 1:
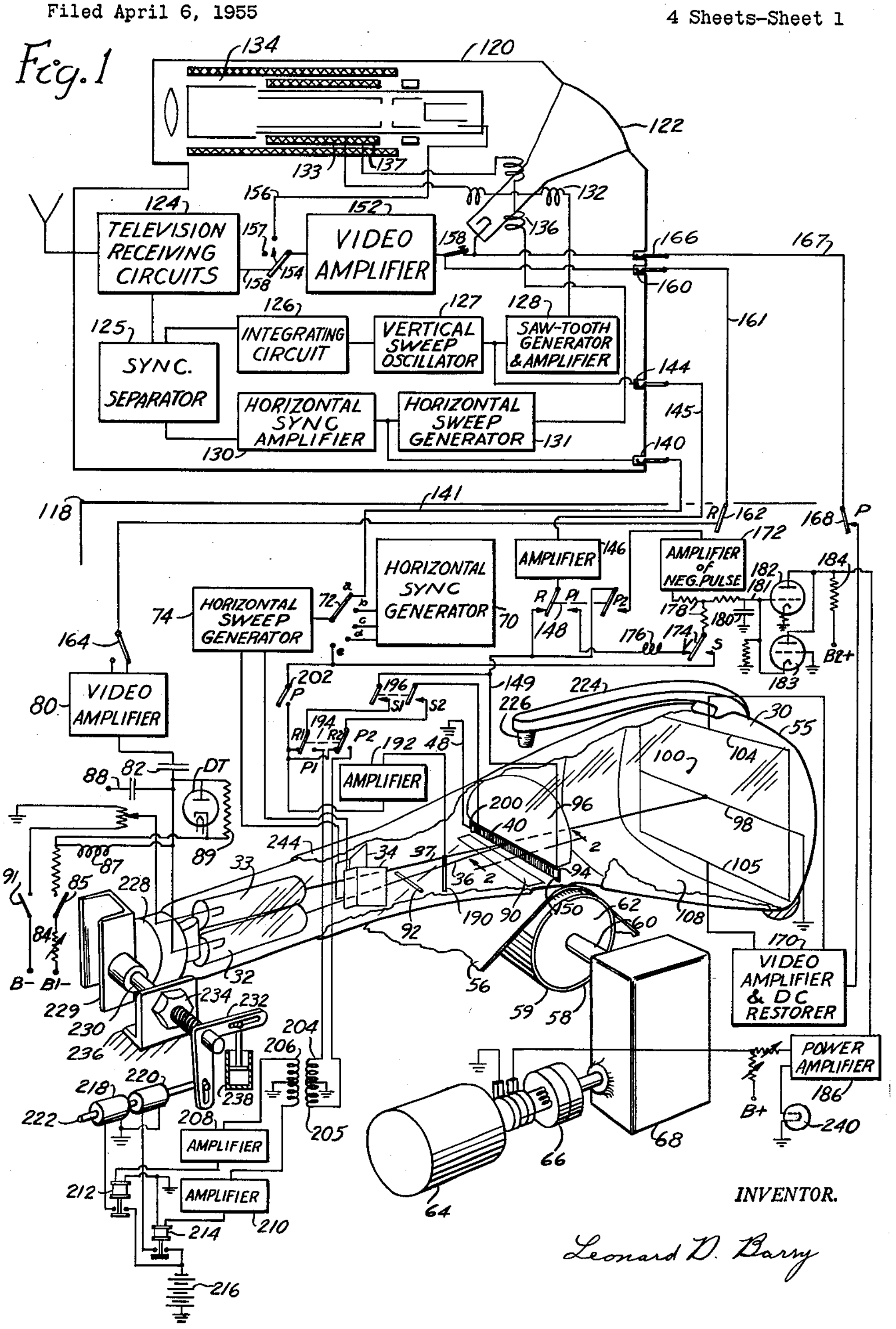
FIGURE 1 is a diagrammatic view of one type of magnetic recording-reproducing tube shown with recording tape and drive and a schematic and block diagram of associated circuits and controls including a television receiver and camera.

Referring to the drawings and in particular to FIGURE 1, the reading and writing head of this preferred recorder for video, which is also adapted for sound and other signal recording and playback, consists of a vacuum tube 30 having therein a writing electron gun 32 and a reading electron gun 33 directly above the writing gun.

A single set of horizontal deflection plates 34 is arranged within tube 30 to deflect the recording beam 36 and reproducing beam 37.

Figure 2:
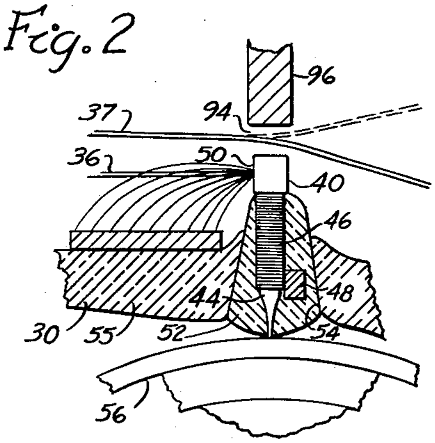
FIGURE 2 is an enlarged sectional view taken on line 2—2 of FIGURE 1 through the recording portion of the tube.

The recording beam 36 is focused on and continuously moves with scanning motion over the ends of a row of recording-reproducing needle-like electromagnets 40 shown in detail FIGURE 2. The needles 40, as I prefer to call them, each have a core 44 of magnetically soft material. A thin coating of enamel or other insulating material covers the core. The coated core is wrapped with a fine wire coil 46 of one or more layers, or the coil could be printed on the insulated core to help keep the needles as small as it is practical to make them with high output relative to their size. The needles 40 are aligned in a straight or curved row having a radius equal to the distance of the row from the center of horizontal deflection of beam 36, and the same end of each coil is fused to a common conductor 48. A conductive material or metal is deposited on the upper ends of each insulated needle embedding the end of the coil for good contact. These end tip deposits are the targets 50 for writing beam 36 and preferably are of a metal such as nickel or platinum which has a maximum secondary emission ratio $\delta$ greater than unity whereby the direction and magnitude of the current through a coil depends on the velocity and number of electrons in beam 36 when it strikes the target of that coil whereby the polarity and flux density of the needle is determined. The targets 50 might also be a metal compound, or a coating on the metal can be used for the actual target surface to provide the desired secondary emission characteristics. The recording ends of the needles are flattened into the row to reduce the gap between needles at the recording tips and the width of the line of recording. The row of completed needles is embedded in insulating material 52 below the targets 50 and inserted in and sealed about an inward wedging opening 54 in the glass envelope 55. The needles protrude a small distance outside the tube where they engage or are in magnetic proximity with tape 56.

The tape 56 is arranged to be transversely scanned by beam 36 crossing the row of needles 40, the row of needles being at right angles to the edges of the tape. Tape 56 is held to the needles by roller 58 because of the shape of tube 30. With either plastic base tape or tape backed with a magnetic shielding layer roller 58 is preferably rubber covered. With a solid metal recording tape roller 58 comprises a cylinder 59 of material having high permeability and low coercivity mounted on shaft 60 by a rubber filling 62 as shown.

The tape, either continuous or reeled in a usual manner, is preferably driven by a series of rollers, of which roller 58 is the only one shown. The drive rollers are driven by synchronous motor 64 through magnetic clutch 66 and three-speed transmission 68 of the positive nonslip type. Suitable flywheels and flexible coupling can also be provided as desired to maintain a steady tape speed in step with the scanning speed which is also controlled in step with the 60 cycle power supply.

A horizontal synchronizing pulse generator 70 provides three output pulse frequencies selectably connected through selector switch 72 to horizontal sweep generator 74 the output of which is connected to the deflection plates 34 of tube 30. The horizontal synchronizing generator 70 is similar to the portion of the synchronizing generator of television systems which supply the horizontal sync pulses with the addition of frequency dividers (or multipliers) and pulse shapers for supplying horizontal pulses at two lower frequencies for sound or signal recording. The output frequencies of generator 70 appear at terminals *b*, *c*, and *d* of selector switch 72. At *b* 15.75 kc. is supplied for recording one line of video per line across the tape. A line of video requires 4,000,000 cy./(30×525) lines=254 cy./line. If 300 needles are provided for video these could only produce 150 cy. for sound. For quality sound recording (16,000 cy.) scanning speed=16,000/150=106.7 lines/sec. minimum. For speech and signals 8,000 cy. are sufficient, and scanning speed=8,000/150=53.3 lines/sec. Therefore, since 60 cy. is readily available and 120 cy. can be obtained by frequency doubling, these frequencies would be made available at *d* and *c* respectively.

A selector switch within the horizontal sweep generator 74 selects the proper charging resistor-capacitor combination in accord with the frequency setting of selector switch 72 whereby the scanning velocity is varied proportional to the scanning frequency. The three speeds of transmission 68 provide tape speeds corersponding to the three scanning speeds for *b*, *c*, and *d*. The transmission 68 can be linked to shift the switch 72 and change the resistor-capacitor selector switch of sweep generator 74 to corresponding positions.

Video amplifier 80 supplies the video, sound, or other signal to be recorded to the cathode of recording electron gun 32 in series with coupling condenser 82. The cathode of the recording gun is biased to a relatively high negative polarity by battery connection B1— connected to the cathode in series with rheostat 84 (for controlling electron velocity), switch 85, and inductance 87. Condenser 82 enables the positive output of the video amplifier to be coupled to the negative cathode bias, but blocks the D.C. signal components. D.C. restoration is provided by diode tube DT connected in parallel with resistor 89 (which with capacitor 82 provides the desired R-C ratio for restoring the D.C.) the plate side of tube DT being connected to the output of capacitor 82 to restore the negative component and the other end to battery B1— through switch 85. If the positive portion of the signal is to have its D.C. restored the plate and cathode connections of tube DT are reversed. Biasing frequencies can be supplied through a coupling condenser 88 to the cathode if desired. A separate A.C. erasing head or a D.C. saturating head (not shown) prepares the tape for the recording process before it reaches the row of needles 40.

The recording beam scans horizontally across the targets on the needles with varying intensity according to the bias and video or other signal being recorded. Secondary emission is collected by a conductive coating or plate 90 or forms a space charge according to whether collector 90 is positive or negative relative to the needles. The needles are preferably maintained at ground potential by grounding lead 48 to prevent current and voltages leaking onto the tape. The power supply connected to B1— (etc.) is also grounded to complete the circuit.

There are two current arrangements for recording that should be distinguished.

(1) A.C. needle recording current, wherewith A.C. erase and bias are used, has the secondary (relative to primary) emission ratio $\delta=1$ and video=gray for the no signal condition, the recording being made using both north and south needle polarities with coil currents established as the difference between primary and secondary emission within the approximate limits of $\delta=\frac{1}{2}$ to $\delta=1\frac{1}{2}$. The D.C. picture components are lost unless separately recorded and reproduced. This type of recording is preferred and provided for sound.

(2) D.C. needle recording current, wherewith D.C. saturation erase and D.C. demagnetizing bias are used, has a no signal condition preferably representing black level for video, the signal being a varying D.C. voltage added to the D.C. bias voltage, or the no signal condition could be gray level the signal being A.C. added to the D.C. bias voltage in either case $\delta=1\pm$ bias current/primary current with D.C. bias current put on each needle. The resulting magnetic recording can have north and south polarities on the same side of the tape if high enough demagnetizing bias is used, or for improved linearity the bias and signal can be reduced to just prevent reversal of remanent polarity on the tape at the expense of signal amplitude. This type of recording is preferred and described for video.

Figure 3:
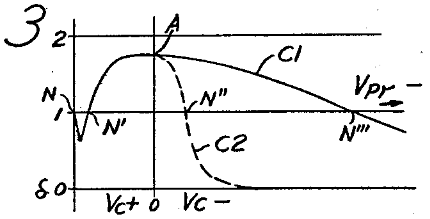
FIGURE 3 is a typical secondary emission curve and collected current curve.

Referring to a typical secondary emission curve C1 and collected current curve C2 (dashed lines) FIGURE 3, where the accelerating voltage V*pr* across a given distance from the cathode to target determines the velocity of the electrons in beam 36 is shown as abscissa and where the ratio $\delta$ of secondary to primary emission is shown as ordinate, a condition represented by either point N, N′, N″, or N‴ is established by selecting the corresponding cathode bias for no needle bias or signal currents. Points N, N′, N″, or N‴ plus or minus any demagnetizing bias, could be used for fixed needle polarity recording or points N′, N″, or N‴ could be used for reversible needle polarity recording. The points usable depend on the curves C1 and C2 of the particular target material, the maximum voltage V*pr* to be used, and the linearity and voltage variation desired. It can be seen that the greater the slope at points N, N′, N″, and N‴ the more effective the signal voltage would be in varying the current through the coils of the needles. With collector 90 at the same or a more positive potential than the needles curve C1 results. If from any point A on the curve C1 the collector potential V*c* is made negative with respect to the needles while V*pr* is maintained constant a curve such as C2 results. About point N″ on curve C2 likely may be found the greatest slope and linearity and so the best working reference point. Further if the accelerating voltage V*pr* is changed by the signal oppositely as the collector voltage V*c* then the signal is more effective in modulating the current through the needle coils when working about point N″ (now moving along line $\delta=1$) with point A (also moving) about the top of curve C1. A given signal added to the cathode when biased to point N′ would have the opposite effect at points N, N″, and N‴. The region used about points N, N′, N″ and N‴ is usually sufficiently linear for recording purposes.

The writing gun 32 is arranged to accelerate the electrons by the required voltage difference on its cathode and anodes to establish point N, N′, N″, or N‴ whereby the number of electrons striking the targets equals the number of secondary electrons emitted whereby scanning by the writing beam with no signal or bias produces no current in coils 46. The signal and A.C. or D.C. tape bias applied to the cathode increases or decreases the electron velocity according as it is negative or positive respectively and causes electrons to flow from the beam through the needle coil or from the ground through the needle coil to the collector 90 according to whether the ratio $\delta$ has been decreased or increased from $\delta=1$ respectively. The current through the needle cores records tape 56 perpendicularly in lines across the tape.

The reproducing beam 33 is turned on for replay by switch 91 while the recording beam is off. The reproducing beam can remain on while recording to provide an adjustment check of the recorder and as a view finder for a camera. The reproducing beam converges toward the recording beam vertically in line therewith. It may be required to provide an electrostatic shield 92 which carries a voltage adjusted to correct change in beam direction when changing from two to one beam and vice versa. Before the two beams meet the recording beam hits the targets while the reproducing beam passes over the tops of the needles in a gap 94 formed by a magnetically soft vertical plate 96 whose lower edge parallels the tops of needles 40. Beam 37 is deflected by the flux picked up by the needles which loops between the ends of the needles and plate 96.

Figure 5:
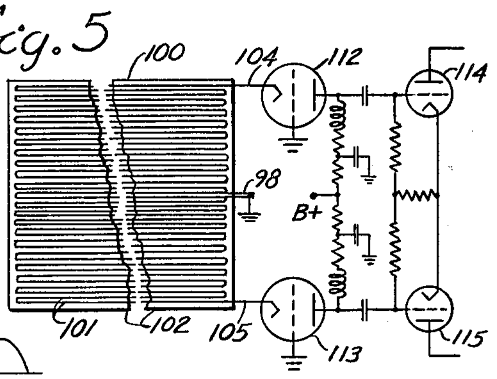
FIGURE 5 is a schematic view of one form of the reproducing resistance surface and amplifying circuits.

When no magnetic signal is received beam 37 sweeps along the straight line of conductor 98 horizontally across receiver 100 which in its preferred form is a resistance strip or wire 101, FIGURE 5, cemented to an insulating plate 102 and run horizontally back and forth across the face of plate 102 and electrically connected at its middle to conductor 98 and at its ends to respectively top and bottom terminal conductors 104 and 105. The varying vertical displacement of beam 37 sets up a varying voltage at the terminals 104 and 105 which is amplified to reproduce the recording on a television picture tube or sound or signal device.

Figure 4:
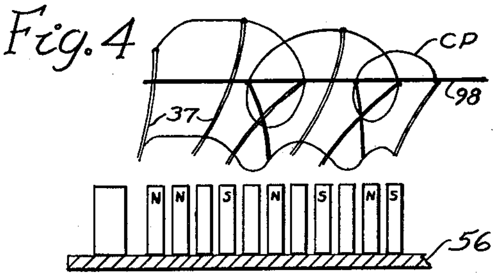
FIGURE 4 is a diagrammatic view partly in section looking with the electron beam within the recording tube, showing how the beam is deflected by the recording.

The magnetic flux between the alternate north and south polarities on the needle tips, FIGURE 4, deflects the scanning beam in a cycloidal path CP along the reproducing surface or matrix 100. The intensity of the reproducing beam is set at a constant value. Preferably a low speed high intensity beam is used for ease of deflection. The displacement of the beam from normal provides a voltage proportional to this displacement above or below line 98. Beam 37 after being deflected can be accelerated as desired by anodes such as collector 108 whereby the beam produces the desired effects such as high or low $\delta$. The beam is preferably in sharp focus where it passes over the needles and relatively spread out at the receiving surface to cover more than one run of wire 101 across plate 102. The voltages are amplified from both the upper and lower portion of the reproducing area by tubes 112 and 113, FIGURE 5, arranged to receive a negative signal for $\delta<1$ which is amplified and converted to positive signals fed to amplifying tubes 114 and 115 which combine the output from the upper and lower areas on face 100 into one signal.

The recorder 118, FIGURE 1, is designed to record from and reproduce on a television receiver or record from a television camera and reproduce on a television receiver. Of course the recorder could be combined with the television receiver or camera as one unit, but it is preferred to limit the bulk of any one unit and reduce duplication of circuits where the television receiver and camera are available. The television receiver and camera are shown as one unit 120, since the camera utilizes the receiver's circuits. The picture tube 122 is arranged as a view finder and comes in handy on the receiver-camera unit 120 to check and adjust the recording as it is made.

Receiver-camera unit 120 comprises usual television receiving circuits 124 from which the sync pulses are separated by sync separator 125, the vertical sync pulses being passed to integrator 126 whose output is connected to vertical sweep oscillator 127 the output thereof being connected to saw-tooth generator and amplifier 128, and the horizontal pulses from the separator 125 being passed to horizontal sync amplifier 130 whose output is connected to horizontal sweep generator 131 all as usually provided in a television receiver. Saw-tooth generator and amplifier 128 feeds the vertical deflecting coils 132 and 133 respectively on the picture tube 122 and camera tube 134 shown connected in series. Likewise the horizontal sweep generator 131 feeds the horizontal deflecting coils 136 and 137 of tubes 122 and 134 respectively and in series. If individual control of the current through the coils 132 and 133, and 136 and 137 is desired the coils 132 and 136 would be respectively in parallel with coils 133 and 137.

The sync signals reproduced by receiver 120 are also utilized for deflections of the beams 36 and 37 during video recording and can optionally be used in playback. The output of the horizontal sweep generator 131 could be connected directly to horizontal deflection coils or plates 34 on the recorder; or as shown, the output of the horizontal sync amplifier 130 is connected through jack 140 external lead 141 to contact *a* on recorder mounted selector switch 72 which connects horizontal sweep generator 74 which supplies deflection plates 34. The output of the vertical sweep oscillator 127 is connected through jack 144 by external lead 145 to recorder mounted class B amplifier 146 the output thereof being connected to record R or play P1 contacts of and by selector switch 148. The record contact R of switch 148 is connected by line 149 to an end-of-the-line recording magnet 150 which records the vertical sync pulses of positive voltage on tape 56.

The video amplifier 152 of receiver-camera 120 has a selective input. Selector switch 154 connects the input of amplifier 152 to the output of camera 134 on lead 156, to an open circuit at contact 157, or to the output of television receiving circuits 124 on line 158. The output of video amplifier 152 is connected through switch 158 to the picture tube 122 and is connected directly to jack 160 wherefrom lead 161 makes external connection to record switch 162 and negative-picture change switch 164 in series to video amplifier 80. Switch 164 selectively connects a bypass about one stage in the video amplifier 80 whereby the signal can be put through an even or odd number of stages to correct a negative picture. The signal input (cathode or grid) of picture tube 122 is connected through jack 166 and external lead 167 in series with play switch 168 to video amplifier and D.C. restorer 170 which is connected to the output of the reproducing area 100 on the recorder. No. D.C. restoration of the output of area 100 is needed, since the needles can record and the displacement of beam 37 can reproduce D.C. signals. Since amplifier 170 has capacitative coupling as shown, FIGURE 5, D.C. restoration is provided.

In the preferred arrangement for replay of video the vertical and horizontal sweeps are supplied by the television receiver tuned to any channel preferably on a local power system to control beam deflections in the picture tube. The output of the vertical sweep oscillator 127 remains connected through jack 144 to amplifier 146 the output of which is now connected to contact P1 of switch 148. Magnetic transducer 150 picks up first a negative and then a positive pulse for each positive vertical sync pulse recorded, returns them through contact P2 of switch 148 to input of a class B amplifier 172 which amplifies preferably the negative pulse and delivers a negative pulse output. The output of amplifier 146 is now coupled through contact P1 of switch 148, phase difference correcting inductance 176, contact V of switch 174, and two current limiting resistors 178 all in series to the output of amplifier 172. From a point between resistors 178 the outputs of both amplifiers are fed to signal comparing integrating and phase difference amplifying circuits comprising charging capacitor 180 across input lead 181 and ground, positive pulse amplifying tube 182 whose grid is connected to lead 181, and negative amplifying tube 183 having a grounded grid and whose cathode is connected to input lead 181. The plates of tubes 182 and 183 are connected together and supplied through resistor 184 by a positive D.C. supply B2+.

The operation of the phase difference comparing circuit is explained with aid of FIGURES 6, 7, and 8. Amplified received pulses C6 from the vertical sweep oscillator 127 are shown in FIGURE 6; while the amplified negative pulses C7, FIGURE 7, reproduced from the recording tape are arranged to be equal to and 180 degrees out of phase with pulses C6 when the pulses from the sweep oscillator and recorded vertical sweep pulses are properly phased. Suppose a pulse C6 is the first pulse received when replay starts, if not canceled by an opposite pulse C7 it puts a charge on condenser 180 which remains charged for a period of time or until canceled by a pulse of opposite polarity. The pulse of opposite polarity when received neutralizes the charge on condenser 180. The resulting voltage input C8, FIGURE 8, to tubes 182 and 183 shows the effect of phase correction in reducing to zero. If pulse C7 was received first the resulting input to tubes 182 and 183 would be of opposite polarity. The output of tubes 182 and 183 is amplified by amplifier 186 arranged to release magnetic clutch 66 by restricting or bypassing current thereto during the signal interavls C8 whereby clutch 66 slips slightly when a phase difference signal C8 is received correcting misalignment between the tape and received vertical sync signals. By this arrangement the top of the recorded pictures is brought to the top of the picture tube. Any time difference between the received and recorded pulses as compared and amplified sufficient to slip clutch 66 during playback will correct the vertical slip of the picture.

An an alternative the recorded vertical sync pulses as amplified could be arranged to supply the saw-tooth generator and amplifier 128 to control the vertical sweep of picture tube 122, though exact interlacing of successive scannings would then be difficult.

This recorder 118 records one line of video per line of recording across the tape, which is the preferred arrangement to keep the number of needles down and the width and speed of the tape down. Adjacent lines of video are recorded touching or slightly overlapped so that line-for-line retrace is not required and tape speed is not critical, since the recording is in solid blocks of one field each and the vertical pulse is recorded by electromagnet 150.

For a good television picture 300 needles have been selected. With, for example, 60 needles/inch the video track on the tape=5″. Since the recording ends of the needles are flattened into the row there could be 400 lines of partially overlapped recording/inch of tape. With 15,750 lines/sec., tape speed would be $$15{,}750/400=39.4''/\text{sec.}$$

or approximately 3¼ ft./sec., which is a practical speed for portable equipment.

For sound and other signal recording provision is made for line-for-line retrace. While recorder 118 can be used for both video and sound it is preferred to use a wider line of needles for sound than for video, so that line-for-line scanning will not be too critical. The speed of scanning and of the tape are coordinated to provide the same tape distance moved per horizontal sweep in playback as in recording, so that beam 37 can follow on transverse lines of recording. This is done by controlling the horizontal sync generator 70 from and operating the synchronous motor 64 on the same power system, using the same changing resistance and capacitance in the horizontal sweep generator 74 and the same transmission ratio of drive 68 for replay as used for recording. The reproducing beam 37 is then brought into phase, to pass over each needle when centered on the line of recording in succession, by an arrangement which locates the recorded lines and checks the beam position relative to the location of the recorded line once each line. Also there is optionally provided a line alignment check to maintain the proper angle between the row of needles and the recorded lines for retrace.

An end-of-the-line detector rod 190 is enclosed within recording tube 30 and is located to intercept the recording and reproducing beams at the end of their sweep. The rod 190 is arranged to provide a net signal current when struck by beam 36 ($\delta$>or<1). Rod 190 is connected to amplifier 192 which amplifies the beam pulses on the rod and feeds them to record contacts R1 and R2 of record-play switch 194 which connects in record position its contacts R1 and R2 respectively to contacts S1 and S2 of video-sound switch 196 which connects in sound position its contacts S1 and S2 to the coil of end-of-the-line recording and finding magnetic transducers 150 and 200 respectively. Transducers 150 and 200 are located at opposite ends of the row of needles 40 preferably within tube 30. The other ends of their coils are grounded on conductor 48. By this arrangement when the recording beam hits rod 190 the amplified signal is recorded by electromagnets 150 and 200 beyond the video and sound recording area on tape 56.

The output of amplifier 192 is also connected in series with play switch 202, video-sound switch 174 via its sound terminal S, and resistors 178 to the output of amplifier 172 which again amplifies the negative voltage pulse of the negative and positive pulse reproduced by transducer 150 for each recorded pulse when switch 148 is in play position and supplies a signal of equal magnitude but of opposite polarity to that supplied through amplifier 192. The signals, similar to those shown in FIGURES 6 and 7, are compared on the same circuit that the vertical sync pulses are compared on and similarly slip clutch 66 when sufficiently out of phase. It should be seen that the line of sound recording should be wide enough to allow clutch 66 to slip whenever the beam 37 starts to scan needles that are off center of the line of recording. Therefore the needles are preferred to provide a wider line of recording than for video and transducers 150 and 200 record a short sharp pulse.

The line locating transducers 150 and 200 are respectively connected through playback contacts P1 and P2 of switch 194 to an optional line alignment circuit which corrects misalignment of the head with respect to lines of recording on the tape. The voltage pulses picked up by transducers 150 and 200 are arranged to be equal in magnitude and polarity sequence. Contacts P1 and P2 of switch 194 are connected to opposite ends of a center grounded coil 204 of coupling transformer 205. One end of the center grounded secondary coil 206 of transformer 205 is fed to class C amplifier 208, the other end to class C amplifier 210. Sensitive relays 212 and 214 respectively energized by amplifiers 208 and 210 close front contacts thereon through which they connect current from battery 216 to solenoids 218 and 220 which are arranged on plunger 222 to pull oppositely.

Tube 30 is pivotally suspended by bracket 224 at tapered pin 226 to the housing of the recorder directly over the center of the row of needles 40. The base of tube 30 is held in socket 228 on channel section 229. A threaded rod 230 rotatably secured and axially held to channel 229 is turned by bell crank 232 secured thereto and axially moved in nut 234 welded to angle 236 secured to the recorder's housing. Plunger 222 is linked to crank 232 to adjust alignment of tube 30. Dash pot 238 and the friction of the threads of nut 234 and rod 230 restrict free movement.

In FIGURE 9 pulse waves W1 and W2 are received from end-of-the-line transducers 150 and 200 respectively at the secondary of transformer 205 where wave W2 is inverted and compared for time difference with the wave W1. The wave W1 is ahead of wave W2. As a result they do not cancel but produce a sum wave W3. Waves W1 and W2 when displaced a half wave length apart sum to a maximum amplitude of twice that of either alone. Therefore a slight displacement produces a strong signal W3 which is amplified by class C amplifier 208 or 210 according to the polarity.

The polarity of the peak of the sum wave depends on which wave W1 or W2 is first, as seen by comparing FIGURES 9 and 10. In FIGURE 9 where wave W1 is first they sum to a positive peak polarity, and in FIGURE 10 where W2 is first they sum to a negative peak polarity. By means of the transformer arrangement 205 similar class C amplifiers 208 and 210 amplify respectively the positive and negative portions of sum waves W3 whereby relay 212 or 214 is closed energizing solenoid 218 or 220 pulling rod 222 to the right or left to turn head 30 into alignment with the recording.

It may be preferred to have tube 30 held rigid to the frame of the recorder to insure line alignment when the same tube both records and reproduces.

The record-play switches are preferably all linked to operate together, and the video-sound switches are likewise ganged together. The D.C. restorer section of video amplifier and D.C. restorer 170 is bypassed and disconnected for sound replay.

The output from rod 190 is connected through amplifier 192 and play switch 202 to terminal *e* of selector switch 72 so that it might be used as an alternative means to trigger the horizontal sweep generator 74 for both recording and reproducing instead of using horizontal sync oscillator 70, in which case the replay speed would be coordinated by comparing the output from rod 190 with the output from end-of-the-line transducer 150 as previously described for sound playback. An electric light 240 connected on an output circuit of power amplifier 186 indicates lack of synchronization for adjustment purposes. The charging resistance-capacitance of horizontal sweep generator 74 is then preferably provided with a fine adjustment to adjust the recorder's scanning sweep.

Tube 30 preferably has a magnetic shield 244 (shown broken away) of magnetically soft sheet metal or a coating of powered magnetically soft material with binder. The area near the needles is not shielded in this way, since this would reduce the flux reaching the beam deflecting tips of the needles.

In the various variations of this invention described in the remainder of this specification like numerals refer to the same or similar part.

An alternative video recording-reproducing beam type head 30*a*, FIGURES 11 and 12, is similar to tube 30 except that a separate writing area is provided instead of using needle mounted targets. The separate recording area provides for extended and expanded scanning permitting the beam diameter and intensity to be increased and the needles to be made smaller and closer spaced for the same quality picture at reduced tape width. Also as shown the recording and reproducing beams are much further apart.

The preferred recording target area comprises a row of vertical wires or strips 250 of target material insulated apart and having the secondary emitting or other electrical properties desired. The lower ends of the needle coils 46 are again grounded on lead 48. The other end of the coil of each needle is connected to a strip of the target material through a wire 252 or printed circuit connection. The wires 252 run from the coil ends along the bottom of the tube then up the face of the tube behind (relative to the beams) the reproducing area 100 to the target strips 250. The wires 252 and target strips 250 are cemented or printed on an insulating or insulated material 254, such as an enameled sheet of steel or brass, that can be bent as shown. Collector 90*a* is mounted at the top of tube 30*a* and is usually preferred to be held at a higher potential than the target areas by battery 256 connected across collector 90*a* and the ground. Operation of tube 30*a* is similar to tube 30 except that the recording beam scans across the recording area 250 instead of across needle-mounted targets.

Though less preferred, a separate recording and reproducing tube could be provided, the recording tube being the same as tube 30 or 30*a* except that the reproducing gun 33 and area 100 would be omitted, the reproducing tube being the same as tube 30 or 30*a* except that the recording gun 32, targets 50 or area 250 and connecting conductors 252, and coils 46 and conductor 48 would be omitted.

Figure 17:
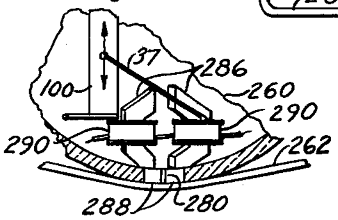

The same recording and reproducing principles can be used for recording and reproducing a sound or signal track along the length of a tape or wire by using a single transducer, such as a single needle, a single coil about a row of needles, a flat-core electromagnet, or a two-core ring-type electromagnet having the target and magnetic deflecting poles enclosed in an electron beam tube. With the ring-type transducer the reproducing beam would be directed through a gap between the poles of the core pieces opposite the recording gap as shown in FIGURE 17.

The advantages of using a beam tube for continuous track recordings lie primarily in replay where good frequency response, displacement amplification, pickup of D.C. signals, and strong signal output can be expected. Therefore for this type of recording only reproducing heads will be described in detail, but it should be understood that such heads could have a recording target and coil or transducer arranged so that the same head could be used for recording as well as reproducing.

The electron deflecting reproducing head tube 260, FIGURE 13 is designed to read longitudinal or perpendicular recordings along the length of a wire or tape 262 reeled between reels 264 and 265 by any suitable drive mechanism (not shown). Tape 262 is placed crosswise the top of tube 260 with its recorded side engaging the tube. Electron beam 37 from electron gun 33 within tube 260 is focused in a sharp beam crosswise tape 262. Tube 260 has a depression 266 in its neck to receive tape 262 close to beam 37 and has an enlarged end 268 for containing the deflected beam and the reproducing area 100. The recording deflects beam 37 causing it to generate a circular path of variable radius on the reproducing area as the tape is moved. Tube 260 also has the stray magnetic shielding coating or covering 244 except around the tape.

Various flux pickup concentrating pieces of magnetically soft core material can be added to tube 260 to limit the deflecting flux to that received at a sharp pole tip or across a gap along the tape. FIGURES 14 through 17 show some arrangements that could be used.

Figure 14:
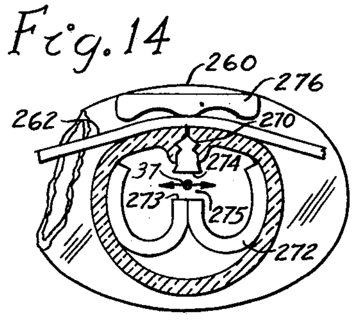

One arrangement, FIGURE 14, has pole pieces 270 embedded through the neck of tube 260 and extending in a fine line across the recording track of tape 262. A W-shaped flux-return piece 272 is inserted in the neck of tube 260 with the edge 273 of its central extension separated from the inner edge 274 of piece 270 by gap 275. Beam 37 is directed through gap 275 with edges 273 and 274 aligned substantially parallel therewith. The outer extensions of the W-shaped piece are curved around a portion of the inner wall of the tube securing piece 272 to the tube and providing signal flux return paths and a stray flux shield. With perpendicular recording backing piece 276 is preferably added. Pieces 270, 272, and 276 are magengtically soft. The deflection of beam 37 is thereby substantially increased, limited to correspond with the recorded flux at pole piece 270, and restricted to substantially linear movement in the plane of gap 275 (horizontal) as shown by arrows.

Figure 15:
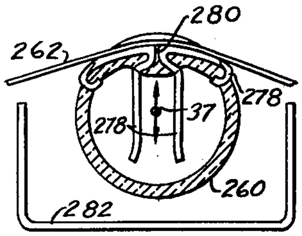

As another alternative, instead of pieces 270 and 272, shielding and pickup poles 278, FIGURE 15, could be added in tube 260. Poles 278 are arranged to form a reproducing gap at the tape and extend therefrom inward the tube straddling beam 37 and outward around a portion of tube. A nonmagnetic metal gap piece 280 is fused airtight to the poles 278 which are embedded through the glass of tube 260. The taper on the gap between poles 278 where they extend into the tube determines the linearity of beam deflection. The poles 278 substantially reduce the area of the tape being read to that across gap 280 and substantially limit deflection to that parallel gap 280 (vertical motion) as shown by arrows. A magnetic shield 282 is also added in the vicinity of the tape 262 to reduce stray flux instead of coating the tube where such coating would provide an alternative path for the signal.

Figure 16:
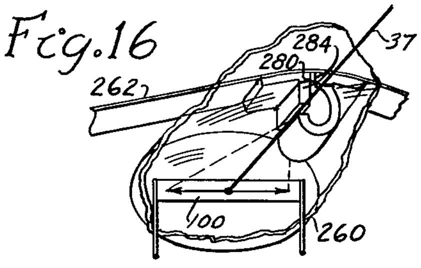

The magnetic pickup poles 284, FIGURE 16, if secured in tube 260 in place of poles 278 would provide substantially horizontal beam deflection as shown.

The magnetic pickup pieces 286, FIGURE 17, provide another alternative flux concentrating arrangement that could be provided in tube 260. Pieces 286 are similar to the pole pieces of a two-core ring-type head except that the pole tips opposite the tape are spread apart and arranged to straddle and deflect beam 37 in the plane of this gap as the beam passes to reproducing area 100 within tube 260. Pieces 286 are cemented to the interior of the tube each against a pole tip 288. Tips 288 with nonmagnetic gap piece 280 fused to each therebetween extend through the tube's wall and are fused thereto airtight. Coils 290 are used for recording.

Again referring to the reproducing area 100 for a more general consideration, it is basically an arrangement to provide an output voltage or current that varies with beam displacement so as to reproduce the recorded signal. In its simplest form the area comprises a single resistance strip which the beam strikes and which carries substantially all the net target current over a portion of the strip determined by the beam's position whereby the voltage drop $V=IR$ across this portion varies with R and I, R being varied proportional to beam displacement with a constant resistance per unit length of the resistor, I being varied with variation of the beam's intensity over a given target material with a given collector potential. The variation of R varies V which varies the beams intensity. Referring to FIGURE 3, preferred working conditions for the reproducing beam are points on the down slope of curves C1 and C2 below $\delta=1$ and points on the up slope (from N') above $\delta=1$, since in these areas an increase of V with R increases I also, further increasing V; and points at or near the top of curve C1 where I can be of high value and substantially constant while R varies V of the resistance strip which varies $V_{pr}$ by this amount. The farther from $\delta=1$ the greater the resulting net target current and output voltage for a given beam current and resistance strip.

There are many possible types and variations of the reproducing area 100. A reproducing area comprising a single resistance strip is shown in FIGURES 16 and 17 and is suited for tubes having beam guiding poles as shown in FIGURES 14, 15, 16, and 17. Where the beam follows either a circular or cycloidal path the strip could be widened to a sheet, but the resistance strip or wire 101 wound back and forth in closely spaced runs across the face of area 100, FIGURE 5, is much to be preferred because of its great length resulting in more easily controlled and linear resistance variation and because the parallel leakage paths of a sheet, which greatly reduce its effectiveness, are eliminated. A few other suitable though more costly arrangements of the reproducing area are shown in FIGURES 18 through 20.

In FIGURE 18 several parallel resistance strips or wires 101 are closely spaced and run from ground conductor 98 to terminal conductor 104, each wire being similarly connected through a rectifier 296 at terminal 104. The rectifiers are arranged for $\delta<1$ to pass current from conductor 104 to the target point and prevent current leaking from conductor 104 through parallel wires 101 to conductor 98. Conductor 104 feeds the grid of tube 298. Since rectifiers 296 prevent the grid charge from being removed through wires 101, resistor 299 is added from grid to ground to enable the grid voltage to follow signal variations and to supply bias potential. If $\delta>1$ then the rectifiers would be reversed.

If the center points of resistance conductors 101 are desired grounded (to increase the effectiveness of beam displacement) rectifiers 296 will be arranged at both ends of strips 101, FIGURE 19, to carry the electrons from strips 101 to the terminal conductors 104 and 105 when designed for $\delta<1$ or carry the electrons from the terminal conductors to the strips when designed for $\delta>1$. Resistors 101 can overlap conductors 104 and 105 and all be treated to become plates of rectifiers 296 where they overlap, as shown.

FIGURE 19 also shows a preferred output coupling for audio frequencies. The ends of the center tapped primary coil of transformer 300 are connected one to the top conductor 104 the other to the bottom 105. The secondary of transformer 300 is fed to the grid of amplifying tube 298. The output appears across resistor 302. The rate of change of current through the primary coil of transformer 300 determines the variation of grid voltage and output. The stationary position of the electron beam does not determine the signal beyond the primary of the transformer, all else being equal.

The variation of the reproducing area 100 shown in FIGURE 20 comprises a series of closely spaced conductors 304 insulated apart as cemented to insulating sheet 102. Conductors 304 are connected to points evenly spaced along a resistance wire 101' which is shown connected from ground to grid of amplifier tube 298. Condenser 306 can optionally be added in series with the grid input to remove the D.C. output of area 100, in which case grid leak resistor 308 also is added. Vertical variation of beam 37 varies the charge on condenser 306 and the grid voltage of tube 298. The reproducing area of FIGURE 20 could be connected for push-pull operation by grounding 101' at its midpoint and connecting its bottom terminal to another tube 298 instead of to ground.

Any of the reproducing areas shown can be used with either grid, cathode, or transformer feed to the amplifying tubes.

FIGURE 21 illustrates a different tube arrangement than shown for tube 260, in that beam 37 is directed at the magnetic medium at the end face of the cathode ray tube 260*a* and is diverted from its normal point of focus by the signal flux crossing the gap 275. Beam 37 should have a slow velocity to deflect easily. $\delta$ is worked at $<1$. A cage-type reproducing area is preferably provided so that reflected electrons and secondary emission is selectively picked up to add to the output signal.

In the preferred form of this type tube a transducer formed of two magnetically soft pole pieces 312 separated by and fused to a nonmagnetic gap piece 314 is embedded in the face of tube 260*a* with gap piece and poles extending through the tube as shown. The inner ends of the C-shaped pole pieces provide a beam deflecting gap 275 through which beam 37 is directed. The reproducing area 100 is bent around the inner face of the transducer and is held thereby. The preferred area 100 arrangement is that of FIGURE 5 with resistor 101 running vertically back and forth in a zigzag line curved around and over an area from one side of the tube to the other. The midpoint of wire 101 at which beam 37 is directed is grounded or held at fixed potential by conductor 98 run between wire 101 and the face of the tube.

Beam 37 is deflected horizontally by flux from tape 262 crossing gap 275 and horizontally and vertically by flux crossing gap 314 resulting in an oval movement of which the horizontal movement of the beam together with reflected and magnetically redirected electrons represents the signal on the passing tape 262 by a voltage variation across the terminals of wire 101. Strong magnetic polarity reversal on the passing tape will redirect the beam or a portion thereof to sweep from the target point as center in a circular arc of 360 degrees for each cycle of magnetic reversal in the same direction as the target point itself is moved by the flux. The reproducing area is curved tubular and then bent around into a torus as shown to utilize this redirected portion of the beam to increase the signal output.

Referring next to the recorder shown in FIGURES 22–25 designed for recording and reproducing information, picture, or sound signals on a stationary magnetic sheet or film. This recorder has a scanning beam head tube 320 arranged to scan a recording-reproducing area 324 on the face of tube 320.

The recording-reproducing area 324 comprises closely spaced horizontal rows of needles 40 whose cores 44 extend perpendicularly through the nonmagnetic or glass wall 55 of the face of the tube so as to engage the magnetic film 56 which is held against the outside face of the tube. Again needles 40 each have their core insulated and wrapped with a coil 46 one end of which is connected to a conductive target cap 50 which covers the end of the needle that is within the tube. A conductive coating 328 is run onto the interior of the face of tube 320 conductively connecting the other ends of coils 46. Coating 328 is connected through record-play switch 330 to ground in record position R or to an output amplifier 332 in playback position P. The coils are similarly wound on the needles. The finished area of needles has a nonmagnetic insulating material 334 run about the needles which sets to strengthen the face of tube 320 and hold the needles in place securely. The face of the tube is curved (for strength) in one plane only so that film 56 can have good contact over its recording area.

Tube 320 has the usual type of cathode, anodes, horizontal and vertical deflecting plates, and collective coating as in a television picture tube; and is supported at its base and front in a usual way to frame 336.

The film 56 is arranged to be held to the face of tube 320 against the needles 40 by a magnetically soft backing plate 338 which is supported on linkage bars 340 to bring it into and away from engagement with the face of tube 320. The linkage bars 340 provide a parallelogram movement to guide plate 338 in its movement. Spring 342 about rod 344 bears against frame 336 to hold the plate 338 and film 56 evenly against the face of tube 320. The edges of plate 338 which face the tube are rounded to prevent damage to the film. Two rollers 346 supported from each side edge of plate 338 guide tape 56 when it is pulled. The tape or film is released from the face of the tube by pulling handle 348 to the position shown in FIGURE 23. The rollers 346 extending vertically the length of the tape then hold the tape away from the face of tube 320 where it may be pulled without rubbing on the needles. Short pieces of film and sheets of magnetic recording medium can be inserted and removed from between the face of tube 320 and plate 338 from the top.

The recording and reproducing beams differ only in intensity or scanning speed. Beam intensity is changed by providing a different bias for recording than for playback. The signal and bias 350 for recording are supplied for example to the cathode through contact R of record-play switch 351, and the replay bias 352 is supplied to the same tube elements selectively through contact P of switch 351.

The usual sweep circuits 354 are provided as in television; except that interlaced scanning preferably is not provided and the number of horizontal lines scanned corresponds to the number of horizontal rows of needles, which can be any number for which there is room. The sweep speed can be as required for the signal and needles.

To record, the medium 56 is magnetically saturated from face to back by passing between saturating erase magnets 356 before being inserted between the face of tube 320 and backing plate 338. The beam 36 is biased in intensity to supply (as by secondary emission) a bias current through the coils when hit by the beam to demagnetize the tape to a working point below its self demagnetizing force. To the biasing intensity of beam 36 is added an intensity variation corresponding to the signal whereby the peak current through different needle coils is varied in accord with the signal, demagnetizing the saturated magnetic medium to various points below its self-demagnetizing force. The recording beam sweeps one or more times over the face of tube 320 hitting targets 50 in succession along the rows of needles. The coil of each needle passes a current when the target of that needle is hit in accord with the biased signal at that instant. The flyback time of the beam is so fast that it does not magnetize the needles sufficiently to effect the recording, since only the maximum demagnetizing force determines the remanent condition of the medium under the needles.

On replay beam 37 is held at a constant intensity, meaning that a constant number of electrons per unit time hit the target area at a constant velocity. Beam 37 sweeps over the targets 50 and provides a weaker current through the coils 46 than beam 36. Beam 37 has a greater or lesser velocity than beam 36 depending on the portion of curve C1 or C2, FIGURE 3, that the beams are working at. For example, if beams 36 and 37 are both above point N″ on curve C2 a reduction of beam velocity will increase the current through coils 46, and beam 37 should then have a higher velocity than beam 36, but if worked below point N″ on curve C2 a reduction of beam velocity will reduce the current through the coils 46 so that beam 37 should now operate at a lower velocity than beam 36. As an alternative to changing the beam velocity for replay the scanning speed of the beam could be increased for replay to reduce the needle current during replay.

The medium 56, located with recorded portions under the needles, magnetizes each needle according to the intensity of magnetization of the medium thereat. The electrical charges caused by the constant beam 37 scanning the needles finds lower impedance in the more magnetized needles than in the lesser magnetized needles whereby the output current of each needle reaches a maximum proportional to the degree of saturation of the needle. The preferred working points for the beam 37 are on the down slope of curve C2 or C1 above $\delta=1$ or on the up slope of curve C1 below $\delta=1$, since there the voltage built up by a high coil impedance will reduce the net target current pulse or charge reducing the maximum coil current further and the low voltage present with low impedance when a highly magnetized needle is hit by beam 37 will provide a relatively increased net target charge increasing the signal output. The recording is not hurt by this reading process, since the demagnetizing effect of the coil currents during replay is less than while recording. The output which represents both A.C. and D.C. signal components is amplified in a video or other amplifier 332 and fed to picture tube 358 or other reproducing device. The same sweep circuits 354 supply the recording and picture tubes. The recording can be adjusted on the face of the tube 320 until the best picture results, or any of several locating arrangements can be provided such as pins 360 in plate 338 engaging and aligning holes 362 in the film with depressions 364 in the face of the tube.

It should be evident that motion pictures can be recorded and played back from a recorder tube 320 by a motion picture film drive mechanism, the film being disengaged from the face of tube 320 between frames while the film is moved, by cam operation of handle 348 synchronized with the film indexing drive.

Having thus described several forms of my invention it is understood that I wish to cover all the variations and modifications which fall within the true spirit and scope of this invention as contemplated to be covered in the following claims.

I claim:

1. A magnetic recorder comprising in combination, a tape transport, a magnetic recording tape thereon, means including an electron beam tube for providing a narrow electron beam, electromagnets of needle-like form spaced apart with nonmagnetic material and secured with one end of each aligned in a row within said tube and the other ends aligned in a row for magnetically engaging said tape to track in adjacent tracks along said tape, beam deflecting and circuit means for imparting to said beam scanning motion, recording targets arranged within said tube so as to be successively struck by said beam as deflected by said last mentioned means and each connected to a coil on a successive said electromagnet, signal means for varying the intensity of said beam as it scans said targets and circuit means for establishing current through the coil of the electromagnet connected to the target which is struck to record the medium, reproducing target means, means for directing a fine electron beam closely over the ends of said electromagnets in said tube to said reproducing target means so that this beam is deflected by flux picked up from a magnetic recording adjacent the outer ends of said electromagnets, said target means comprising means for causing a variable output voltage to appear having a value representing the recorded signal, and means connected across said target means to represent the recorded signals.

2. In a recorder as claimed in claim 1, the recording tips of said electromagnets being flattened out in the row to form a fine and substantially full line.

3. In a recorder as claimed in claim 1, said tube being pivotally supported on the axis through the midpoints of said row of transducers, and means arranged to align said head with transversely recorded lines on a magnetic tape arranged to move past said needles, magnetic pickup means for picking up signals at the ends of each recorded line, and electrical circuit means associated with said pickup means for comparing those signals to produce a difference signal of such polarity as to distinguish which direction to turn said tube, and means controlled thereby to automatically adjust alignment of said tube.

4. In a recorder as claimed in claim 1, two heads for recording and replay of signals on said tape simultaneously at opposite ends of the row, means for combining the signals from said heads so as to cancel and means controlled by said last means to correct a delay in the cancellation of an early signal by adjusting the position of the tape relative to the transducers.

5. In combination, a television receiver and a magnetic recorder for television pictures including a tape transport, a magnetic tape on said transport, an electron beam switching tube having a row of targets therein, a plurality of electromagnetic transducers having cores of magnetically soft material with at least one coil thereon and arranged in a row in said tube for both recording and replay of a transverse picture line on the tape against the tube, means for providing an electron beam in said tube and means for deflecting said beam across said targets in step with the horizontal sweep generator of said receiver for recording, the coil means of each transducer being connected to a said target in the beam circuit, means to connect the output of the video amplifier of the television receiver to the beam supply to modulate the beam to record a signal with variable maximum current through successive coils of said transducers, said tube having means for reading said transducers successively for reproducing the recorded signal, and means for synchronizing the tape transport during replay with the vertical sweep oscillator of said receiver.

6. A recorder and receiver as claimed in claim 5, said last mentioned means comprising a transducer in spaced relation to said row of transducers on said tape and connected for recording vertical synchronizing pulses from the vertical sweep oscillator, means on said recorder to reproduce recorded vertical synchronizing pulses and compare them so as to cancel when synchronized with the vertical synchronizing pulses reproduced by the receiver, control means connected to the output of said last mentioned means for automatically adjusting the tape position along its line of travel when a substantial uncanceled resulting pulse is passed by said last mentioned means whereby the top of a picture being reproduced from the recorder is brought to the top of the picture tube on which it is being reproduced.

7. A recorder and receiver as claimed in claim 5 and a television camera, circuit connections whereby a horizontal synchronizing signal received, separated, and amplified by said receiver is arranged to control the horizontal sweep of said camera and the transverse scanning of said transducers, circuit connections whereby the vertical synchronizing signal received, separated, and amplified by said receiver is arranged to control the vertical sweep of said camera and to be recorded by said recorder in a particular track on said tape, and circuit means whereby the video output of said camera is recorded by said recorder in a track on said tape parallel and adjacent said particular track.

8. A magnetic recording head comprising an electron beam tube; electromagnetic needle-like transducers each having a core, a coil thereon, and a target on an end of and insulated from the core and electrically connected to said coil thereon; said transducers being arranged in a row over an area of the face of said tube with the ends of said cores opposite the targets extending through the tube's wall; conductive means electrically connecting the ends of said coils opposite said targets; an output terminal connected to said conductive means; deflecting means arranged to deflect the beam of said tube over the targets of said cores with scanning motion for magnetically recording a plurality of rows on a magnetic medium placed against said transducers opposite said targets.

9. A head as claimed in claim 8 having a plurality of closely spaced rows of said transducers covering an area of the face of said tube, said targets covering the end faces of said transducers, said deflecting means being arranged to scan successive rows of said transducers in succession, and said conductive means comprising a coating on the inner side of the face of said tube, said magnetic medium being a sheet engaged against the outer faces of said transducers whereby said beam records a plurality of rows of said medium while the medium is stationary.

10. A magnetic recorder having a head as claimed in claim 9, a frame, a magnetically soft backing plate having pins spaced to locate and hold a magnetic medium between said plate and the face of said tube, guided means connecting said plate and frame for movably supporting said plate to said frame whereby said plate can be conviently engaged and disengaged from the face of said tube for insertion and location of the magnetic medium for recording against the face of said tube.

11. A magnetic recorder having a head as claimed in claim 10, guide means supported from said backing plate for engaging opposite front edges of the medium to hold the magnetic medium to said backing plate when disengaged from the face of the tube.

12. A magnetic recording-reproducing head comprising an electronic scanning beam tube; an electron gun and circuit means providing an electron beam, recording-reproducing transducers each having a core, a coil thereon, and a target electrically connected to one end of said coil in said tube; and a current return path for the target electrons, said path being connected to the ends of the coils opposite the targets; said targets being arranged to be scanned by said beam within said tube; means to vary the intensity of said beam during scanning for recording a magnetic medium against said cores opposite said beam, said beam being held to substantially constant value for replay, means to deflect said beam to scan said targets, the circuits completed by said beam through said coils of said transducers in the succession of scanning, the cores of said transducers being variously saturable by a magnetic recording made thereby whereby the scanning of a steady beam over said targets produces a current through each said coil which varies with the magnetic recording.

13. In a magnetic recorder, a plurality of electromagnetic transducers for recording successive portions of a signal, an electron beam tube having therein beam deflecting means and a plurality of targets, each electrically connected to one end of the coil means of each said electromagnetic transducer for distributing the signal to said transducers; the electromagnetic transducers being placed and secured within the tube with their recording poles effectively extending from said tube so as to engage a magnetic medium held against the tube, and a conductive coating on the inner wall of the tube connecting the outer ends of the coils of said transducers.

14. A magnetic recording-reproducing head comprising an electron beam tube having an electron gun providing an electron beam therein and a magnetic medium associated therewith, an electromagnet in said tube having a core piece which extends to substantially said medium at one pole and to magnetic proximity to said beam at its other pole so that a recording on said medium deflects said beam, and beam receiving means to reproduce the recorded signal, circuit means including the coil of said electromagnet for imparting a flux pattern to said medium.

15. A head tube as claimed in claim 14, said beam receiving means comprising two substantially parallel conductors insulated apart, rectifiers, a series of resistive conductors each connected in series with a rectifier across said parallel conductors, said rectifiers being arranged to pass current to the same said parallel conductor, said resistive conductors being closely and parallelly run to form a target surface for the reproducing beam in said tube to develop a voltage output across said parallel conductors varied according to the signal deflection of the beam.

16. A head tube as claimed in claim 15, said parallel conductors being flat strips, said series of resistive conductors being flat strips each with a flat face against a flat face of each said parallel conductor, said recitifiers being formed between said resistive conductors and both said parallel conductors, and a conductor connecting similar intermediate points of said resistive conductors for zero signal reference.

17. A head tube as in claim 9, said beam receiving means comprising a series of parallel and closely spaced but insulated apart conductors, said receiving means including a resistance connecting adjacent said conductors together.

18. A head tube as in claim 9, said beam receiving means comprising a resistor run back and forth in a plurality of closely spaced runs to form a target surface for the beam, and insulating means supporting said resistor to said tube so that adjacent runs of said resistor are insulated apart, and end terminals on said resistor brought out through said tube.

19. A magnetic recording-reproducing head comprising in combination, a vacuum tube, electron beam supply means including an electron gun for supplying a recording beam and an electron gun for supplying a reading beam, each said gun being in said tube, a row of recording targets in said tube, a row of recording-reproducing needle-like electromagnetic transducers each having a coil thereon in said tube, said beam supply means including circuit means connecting each said target through a said coil to enable said beam to complete a circuit through the said coil representing the target struck by the beam, a magnetic recording medium in magnetic proximity to an end of said transducers, and means to sweep said beam across said targets, signal means for varying said beam as it sweeps to cause currents in the said coils to record the signal on the medium, signal reproducing target means in said tube, said reading beam being directed to said reproducing target means and past the ends of said transducers opposite the recording medium whereby the recorded signal deflects said beam to particular reproducing target areas according to the signal recorded.

20. A magnetic recorder which comprises a beam tube head having a row of recording-reproducing transducers as part thereof, electronic gun means for providing a writing beam which varies in intensity with variations of a signal, an electrically charged reading beam which has substantially constant intensity, a row of targets each electrically connected to a recording coil on a said transducer, deflecting and sweep generating means arranged to cause said writing beam to scan successively over said row of targets arranged to record a magnetic medium and said last mentioned means being arranged to cause said reading beam to scan successively past said transducers, said transducers being arranged to successively deflect said reading beam, a reproducing matrix to which said reading beam is directed and on which it is deflected, said reproducing matrix being of an electrical resistance material having output terminals providing a voltage variable with beam displacement, and electrically operated means connected across said terminals to utilize said voltage to reproduce the recorded signal.

21. A magnetic reader which comprises a beam tube head having therein a row of transducers each having a coil on a magnetically soft core, targets lined in a row and each electrically connected to a said coil and an electron gun and power means for providing a beam to scan said targets, a magnetic medium engaging the row of transducers opposite the beam, a record on said medium for pickup by said transducers, circuit means connecting the coils of said transducers to said power means so that variations of flux picked up by said transducers determines the current through said coils when hit by said beam whereby the beam current represents the recorded signal.

22. A transverse scanning magnetic recorder for video wherein only the picture signal is transversely recorded for replay, a tape transport on said recorder, a magnetic tape for video signals on said transport, a vertical sweep oscillator for controlling the scanning of said recorder, a magnetic head engaging said tape along a longitudinal track thereon, means connecting said head to said sweep oscillator to record vertical sync pulses on said tape during recording, means for reproducing the recorded video signals during replay, means including said head for reproducing said pulses from said tape, a capacitor and means for charging said capacitor with said pulses which are reproduced from said tape by said head and for oppositely charging said capacitor with equal pulses from said oscillator so as to annul a pulse as reproduced from said tape with a pulse from said oscillator, and means controlled by a charge on said capacitor to adjust the tape to bring the top of the recorded picture to the top of the picture tube.

23. A magnetic recorder-reproducer for video signals which comprises a cathode-ray head tube having therein a video voltage signal reproducing matrix, recording and reading electron gun means providing a recording beam and a reading beam, said gun means being positioned to direct said reading beam on said matrix, a plurality of magnetic transducers arranged in a row between said matrix and said gun means; beam supply means connected to said gun means, a magnetic recording tape, a tape transport for carrying said tape past said transducers, said transducers being spaced transversely on said tape and each having an inner pole in the vicinity of the path of said reading beam and an outer pole engaging said tape, a magnetically soft plate spaced from the inner poles of said transducers to form a gap in said tube through which said reading beam is directed to draw flux from said transducers across said gap to deflect said reading beam, a coil on each said transducer, targets in said tube each electrically connected to an end of the coil of a said transducer, the other ends of said coils being connected to said beam supply, a source of video signal, a horizontal sweep generator connected to be synchronized from said source, recording-reading-beam deflecting means associated with said tube and connected to said generator to sweep said recording beam across said targets and said reading beam along said gap once per video line, said targets being arranged to be struck in the same sequence as said transducers are aligned and to be similarly polarized by a beam of given intensity sweeping said targets, the video signal of said source being connected to said gun means to modulate the intensity of said recording beam to variously magnetize said transducers as said recording beam sweeps said targets to record each line of video across said tape in step with the horizontal sweep generator, a television receiver receiving video signals from said source, means connecting said receiver and matrix to modulate the beam of the receiver's picture tube according to the voltage signal appearing across said matrix, and means to adjust the relation of the tape transport and said head tube to synchronize the vertical sweep signal applied to said picture tube with the reproduction of the top of the recorded picture.

24. With a recorder as claimed in claim 23, in combination, said source having a vertical sweep oscillator, a record-play switch, a magnetic synchronizing transducer on said tape connected through said switch to said oscillator to record vertical synchronizing pulses on said tape when said head tube is recording video signals on said tape, sweep circuits in said source supplying vertical and horizontal synchronizing pulses, an integrating circuit and circuit means for combining the vertical synchronizing pulses from said receiver with the voltage pulses from said synchronizing transducer of opposite polarity, and automatic means to adjust vertical picture alignment according to the phase difference between the recorded and supplied vertical pulses.

References Cited in the file of this patent

UNITED STATES PATENTS

| | | |
|---|---|---|
| 1,867,542 | Hammond | July 12, 1932 |
| 2,165,307 | Skellett | July 11, 1939 |
| 2,176,742 | La Pierre | Oct. 17, 1939 |
| 2,236,578 | Parker | Apr. 1, 1941 |
| 2,280,946 | Goldsmith | Apr. 28, 1942 |
| 2,374,666 | Cuniff | May 1, 1945 |
| 2,531,624 | Hanscom | Nov. 28, 1950 |
| 2,540,490 | Rittner | Feb. 6, 1951 |
| 2,604,321 | Williams | July 22, 1952 |
| 2,657,377 | Gray | Oct. 27, 1953 |
| 2,657,378 | Gray | Oct. 27, 1953 |
| 2,697,754 | Ranger | Dec. 21, 1954 |
| 2,713,649 | Parker | July 19, 1955 |
| 2,720,558 | Skellett | Oct. 11, 1955 |
| 2,724,021 | Goeppinger | Nov. 15, 1955 |
| 2,751,439 | Burton | June 19, 1956 |
| 2,773,120 | Masterson | Dec. 4, 1956 |
| 2,793,344 | Reynolds | May 21, 1957 |
| 2,857,458 | Sziklai | Oct. 21, 1958 |
| 2,892,017 | Houghton | June 23, 1959 |
| 2,900,443 | Camras | Aug. 18, 1959 |
| 2,976,354 | Banning | Mar. 21, 1961 |